(12) United States Patent
Unger

(10) Patent No.: US 7,865,922 B2
(45) Date of Patent: Jan. 4, 2011

(54) LOW-POWER BROADCAST RECEIVER

(75) Inventor: Robert A. Unger, El Cajon, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 2192 days.

(21) Appl. No.: 09/835,991

(22) Filed: Apr. 16, 2001

(65) Prior Publication Data

US 2002/0152473 A1 Oct. 17, 2002

Related U.S. Application Data

(60) Provisional application No. 60/237,567, filed on Oct. 3, 2000.

(51) Int. Cl.
- H04N 7/10 (2006.01)
- H04N 7/025 (2006.01)
- H04N 5/445 (2006.01)

(52) U.S. Cl. .............. 725/50; 725/32; 725/33; 725/107

(58) Field of Classification Search ......... 725/131–134, 725/139–142, 151–153, 22–23, 107, 32, 725/33, 50; 348/730, 725, 460; 455/574
See application file for complete search history.

(56) References Cited

U.S. PATENT DOCUMENTS

| | | | |
|---|---|---|---|
| 4,858,006 A | 8/1989 | Suzuki et al. ............... 358/139 |
| 5,170,159 A | 12/1992 | Kawabata et al. ...... 340/825.22 |
| 5,249,164 A | 9/1993 | Koz ............................. 358/21 |
| 5,296,932 A | 3/1994 | Long ........................... 348/731 |
| 5,555,032 A | 9/1996 | Kung .......................... 348/730 |
| 5,619,250 A | 4/1997 | McClellan et al. ............. 348/10 |
| 5,625,882 A | 4/1997 | Vook et al. ................. 455/38.3 |
| 5,651,010 A | 7/1997 | Kostreski et al. ............. 370/537 |
| 5,659,353 A | 8/1997 | Kostreski et al. ............... 348/21 |
| 5,870,613 A | 2/1999 | White et al. ........... 395/750.01 |
| 5,883,669 A | 3/1999 | Hitachiya et al. ........... 348/377 |
| 5,894,331 A | 4/1999 | Yang ........................... 348/730 |
| 5,903,765 A | 5/1999 | White et al. ........... 395/750.02 |
| 5,990,927 A | 11/1999 | Hendricks et al. ............... 348/6 |
| 6,052,750 A | 4/2000 | Lea ............................. 710/72 |
| 6,054,981 A * | 4/2000 | Kimoto et al. ............... 345/211 |
| 6,085,017 A * | 7/2000 | Rilly ........................... 386/46 |
| 6,271,893 B1 * | 8/2001 | Kawaguchi et al. ......... 348/725 |
| 6,285,406 B1 | 9/2001 | Brusky ....................... 348/552 |
| 6,658,231 B2 * | 12/2003 | Nakatsuyama ............. 455/3.06 |

(Continued)

FOREIGN PATENT DOCUMENTS

EP   0 760 583 A2 *   3/1997

(Continued)

*Primary Examiner*—Hunter B Lonsberry
(74) *Attorney, Agent, or Firm*—Haverstock & Owens, LLP

(57) ABSTRACT

Broadcast receivers operate in a power-saving standby mode while retaining the ability to receive broadcast program, software, and firmware updates. The most power hungry circuits are deprived of power in the standby mode using a wake-up switch controlled by an update sensor that actively monitors the broadcast channel in the standby mode. If the receiver receives an update-pending indication while in the standby mode, then the wake-up switch provides power to those components needed to receive the update without indicating a power-on condition to the user.

21 Claims, 3 Drawing Sheets

U.S. PATENT DOCUMENTS

| | | | |
|---|---|---|---|
| 6,690,655 B1 * | 2/2004 | Miner et al. | 370/278 |
| 2002/0073423 A1 * | 6/2002 | Krakirian | 725/40 |

FOREIGN PATENT DOCUMENTS

| | | | |
|---|---|---|---|
| JP | 5-344022 | | 12/1993 |
| JP | 05-344022 | | 12/1993 |
| JP | 9-275530 | | 10/1997 |
| JP | 10-228338 | | 8/1998 |
| JP | 10-285482 | | 10/1998 |
| JP | 11-196342 | | 7/1999 |
| JP | 11196405 | * | 7/1999 |

\* cited by examiner

LOW-POWER BROADCAST RECEIVER

CROSS-REFERENCE TO RELATED APPLICATIONS

This application claims the benefit under 35 U.S.C. §119 (e)(1) of the Provisional Application filed under 35 U.S.C. §111(b) entitled "Wake Up Methods for Equipment in the Stand-by Mode," Ser. No. 60/237,567 filed on Oct. 3, 2000.

BACKGROUND

FIG. 1 (Prior Art) is a diagram of a broadcast television system 100, including a broadcast headend 102 connected via a broadcast network to a number of receivers 104. The broadcast network can be wired (e.g., a cable system), wireless, or a combination of the two. Broadcast headend 102 optionally includes a server (not shown) maintained by a broadcaster to store digital information for broadcast. Similar servers can be maintained by other entities and can be made available to receivers 104 via a separate broadcast medium or a direct connection, such as via a modem or satellite connection.

Each receiver 104 has a corresponding display, often a conventional television set 106. Each receiver 104 connects to its respective television set 106 via an audio-video link 110. Users control receivers 104 via a user-input device, typically an infrared remote control 108 or a control panel (not shown) on their respective receivers 104.

FIG. 2 is a block diagram of a typical digital receiver 104. A digital processor 202 is the "brains" of receiver 104. Processor 202 typically includes a number of components, including a central processing unit (CPU) and memory, for example. Processor 202 has many variations, depending primarily upon the desired functionality. The internal workings of processor 202 are outside the scope of this disclosure. Those interested in additional information about a typical set-top box may refer to U.S. Pat. No. 5,940,074 entitled "Remote Upgrade of Software Over a Network," which is incorporated herein by reference.

An infrared interface 214 receives instructions from an infrared remote control. A simple display 216 provides the user with a visual indication of e.g. whether receiver 104 is powered on and, if so, the channel to which broadcast interface circuit 204 is tuned. Processor 202 may present additional information to the user via the attached video display. Receiver 104 optionally includes a modem 210 for connecting to the Internet and some form of local mass storage 212, such as a disk drive.

Processor 202 receives data derived from broadcast video signals by a broadcast-interface circuit 204. Broadcast interface circuitry 204 includes one or more tuners that discriminate one signal from among a number of incoming broadcast signals and removes the associated carrier frequency. Interface circuitry 204 digitizes the resulting audio and video data and conveys the resulting digital information to processor 202.

Processor 202 processes the information from interface circuit 204 as necessary to present appropriately formatted audio and video data to an audio digital-to-analog converter 206 and a video encoder 208, respectively. The resulting signals are then conveyed to television 106 or some other display.

Receivers 104 receive periodic updates from broadcast headend 102. For example, a broadcaster may send each receiver 104 an updated program guide or a software update. Some components of receiver 104 must be powered up to receive broadcast content; unfortunately, this means much of the receiver is always powered up, even when the user is not watching television, and has therefore turned off receiver 104. In the depicted example, a power supply 220 provides power continuously at least to broadcast interface circuit 204, processor 202, and IR interface 214. In point of fact, turning "off" common receivers similar to the ones described here typically removes power only from user display 216: turning off the user display comforts frugal consumers, but saves little power.

Leaving most of receiver 104 on at all times wastes power and money. To make matters worse, receivers of the type described herein are proliferating, and are in the process contributing to an epidemic of power shortages. There is clearly a need for more power-efficient broadcast receivers.

SUMMARY

The present invention is directed to broadcast receivers capable of operating in a power-saving standby mode while retaining the ability to receive broadcast program, software, and firmware updates. The receivers have a broadcast interface that incorporates an update sensor adapted to sense broadcast updates.

The receiver includes a wake-up switch, controlled by the update sensor, that deprives the most power hungry circuits of power in the standby mode. The update sensor, a relatively power efficient circuit, remains active at all times. User-controlled input circuits, such as an infrared receiver or power switch, also remain active at all times.

If the receiver receives a wake-up instruction in the standby mode, then the sensor closes the wake-up switch to provide power to those components needed to receive the update. In one embodiment, components not required for the update, such as the display, an audio DAC, and a video encoder, are not powered on during the update. This aspect of the invention saves power and avoids startling unsuspecting users by automatically turning on their displays and speakers.

Receivers in accordance with one embodiment include a second power switch that selectively delivers power to those components not controlled by the wake-up switch. If the user instructs the receiver to turn on, then the wake-up switch and second power switch both close (if they are not already closed) to provide power to the entire receiver. A display on the receiver typically provides a visual indication that the receiver is on, and audio and video signals provide contents for display on an associated display device, such as a television.

If the user instructs the receiver to turn off during receipt of an update, then only the second power switch opens, leaving power to those components needed to receive the update. If, on the other hand, the user instructs the receiver to turn off in the absence of an update, then both switches open, leaving the receiver in the standby mode.

The scope of the invention is defined by the claims, and not by this summary.

DETAILED DESCRIPTION

Figure 1:
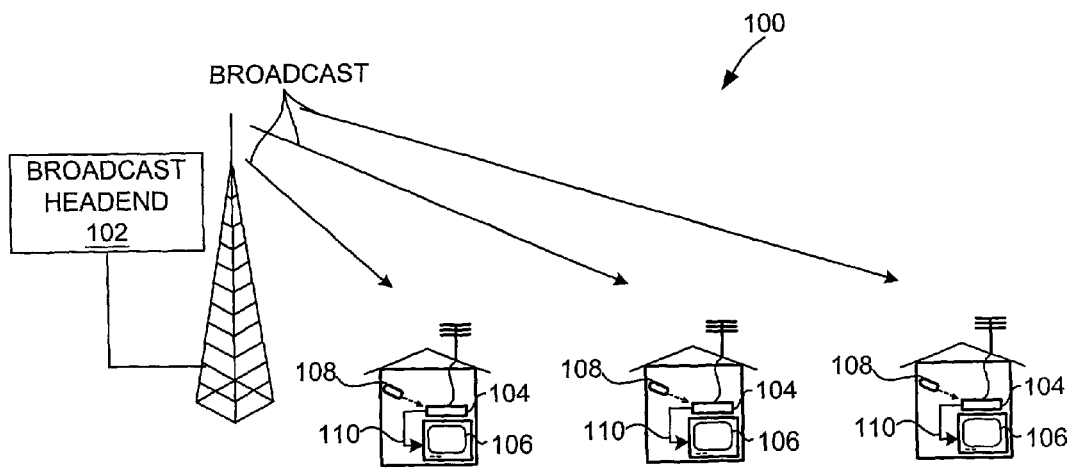
FIG. 1 (Prior Art) is a diagram of a broadcast television system 100.
Figure 2:
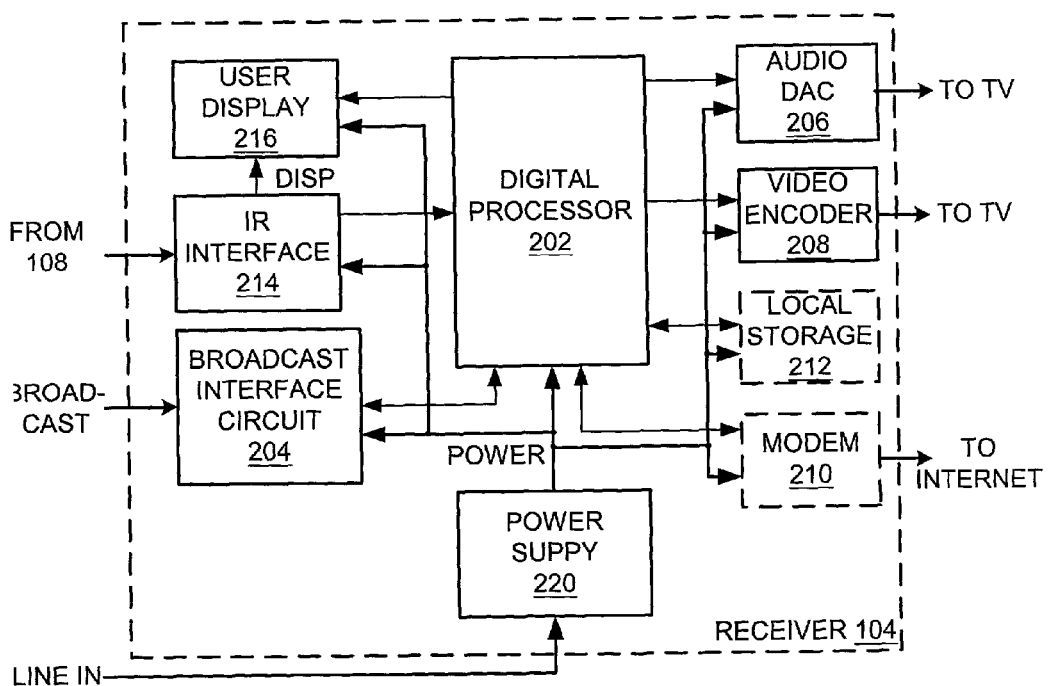
FIG. 2 (Prior Art) is a block diagram of a typical receiver 104.
Figure 3:
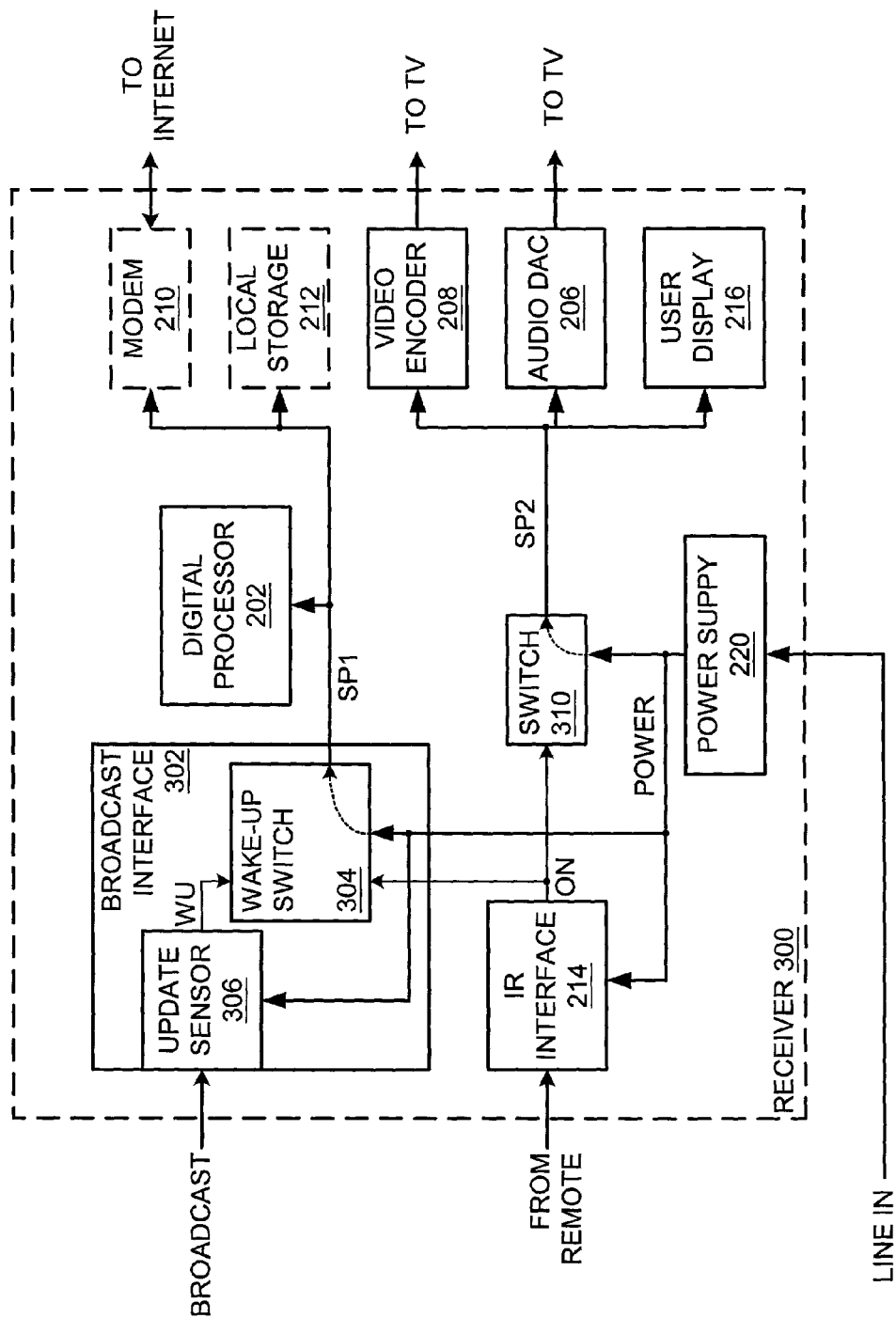
FIG. 3 depicts a receiver 300 in accordance with the present invention.

FIG. 3 depicts a receiver 300 in accordance with one embodiment of the present invention. Receiver 300 has many components in common with the conventional receiver 104 of FIGS. 1 and 2, like components labeled using the same numbers. Unlike the conventional receiver, however, receiver 300 is adapted to operate in a power-saving standby mode while retaining the ability to receive broadcast program, software, and firmware updates. Most of the data and control paths are unnecessary for understanding the present invention, and have therefore been eliminated for simplicity.

In accordance with the invention, receiver 300 includes a broadcast interface 302 with a wake-up switch 304 and an update-sensor 306. Instead of a direct connection to power supply 220, power is applied to components employed in receiving updates via wake-up switch 304. Wake-up switch 304 thus deprives the most power-hungry circuits in receiver 300 of power in the standby mode. Update sensor 306, a relatively efficient circuit, remains active at all times. IR interface 214 also receives power at all times, and is therefore prepared to respond to power-on instructions from the user.

If receiver 300 receives a wake-up instruction while in the standby mode, then update sensor 306 provides a wake-up signal on line WU to wake-up switch 304. In response, switch 304 closes to provide power on switched-power line SP1 to those components needed to receive the update, such as processor 202. In the depicted embodiment, components not required for the update, such as display 216, audio DAC 206, and video encoder 208, are not powered on during receipt of the update. This aspect of the invention saves power and avoids startling unsuspecting users by automatically turning on their televisions and receivers.

IR interface 214 has a control output ON connected to a second power switch 310 and broadcast interface 302. If the user instructs receiver 300 to turn on, via IR interface 214 or an optional switch (not shown) on receiver 214, for example, then the control signal on line ON closes wake-up switch 304 to provide power to those components needed to receive the incoming signal, such as processor 202, display 216, audio DAC 206, and video encoder 208. The signal on line ON also closes switch 310 to provide power to user display 216, audio DAC 206, and video encoder 208. Closing switch 310 provides a visual indication of the "on" condition and presents the requisite signals to the associated display, e.g., television 106. In one embodiment, receiver 300 provides switched line-in voltage to a socket (not shown) on receiver 300 to control power applied to television 106 or some other component.

If the user issues a power-off instruction, typically using a remote control to communicate with IR interface 214, then the control signal on line ON opens switches 304 and 310 to remove power from the components connected to power supply 220 via switched-power lines SP1 and SP2. This action places receiver 300 in a standby mode; power is still applied to IR interface 214 and broadcast interface 302: update-sensor 306 remains on to detect the presence of updates, such as a new program guide or a software or firmware upgrade.

Conventional wake-up circuits, such as those used to activate computer monitors from a standby mode, provide power in response to signals presented to the wake-up circuit. These conventional circuits are not used in receiver 300 because broadcast signals are generally always present. Update sensor 306 is therefore adapted to differentiate between signals indicative of a pending update and other broadcast signals.

Figure 4:
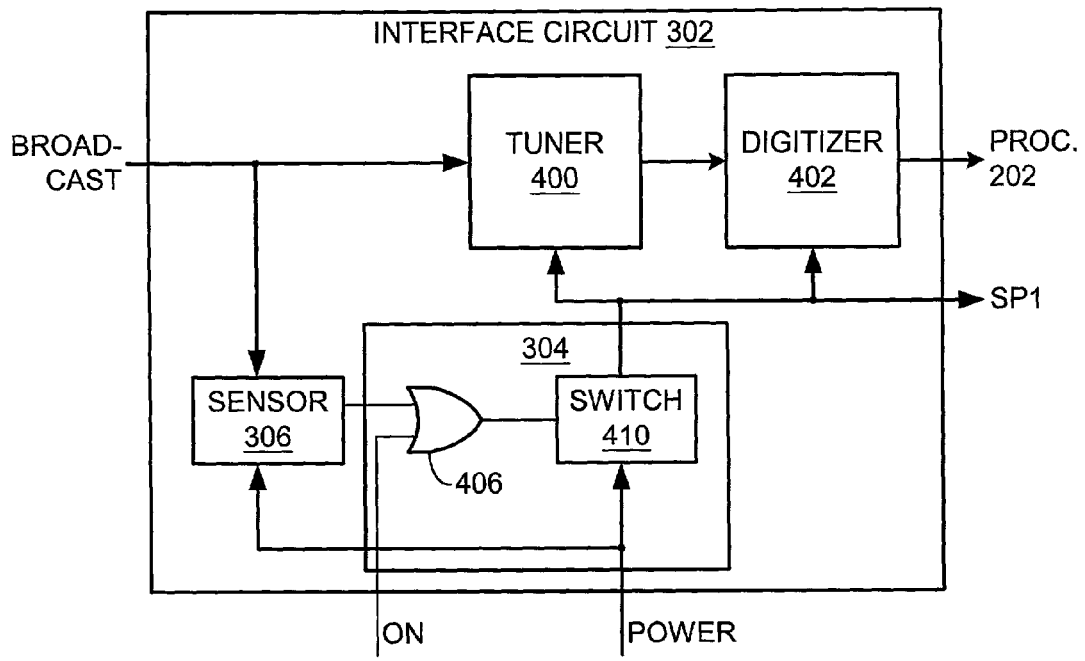
FIG. 4 depicts an embodiment of broadcast interface 302.

FIG. 4 depicts an embodiment of broadcast interface 302. Broadcast interface 302 includes a conventional tuner 400 capable of discriminating one signal from among a number of incoming broadcast signals and removing the associated carrier frequency. A conventional digitizer 402 then digitizes the resulting video signal and conveys the resulting data to processor 202.

Tuner 400 and digitizer 402 collectively use a substantial amount of power. Tuner 400 and digitizer 402 are therefore connected to power supply 220 (FIG. 3) via wake-up switch 304 so tuner 400 and digitizer 402 do not draw power in the standby mode.

In the depicted embodiment, wake-up switch 304 includes an OR gate 406 connected to a conventional power switch 410, typically a relay. Sensor 306 in turn includes a simple tuned circuit adapted to monitor a wake-up signal associated with one broadcast carrier frequency. In one example, sensor 306 produces an enabling logic-one output signal to OR gate 406 if the amplitude of the broadcast wake-up signal rises above a predetermined level for a period of time sufficient to reject noise spikes, the rise in amplitude representing a wake-up instruction. If sensor 306 produces a logic one on one input of OR gate 406, then OR gate 406 produces a logic one output signal that closes power switch 410. Broadcast interface 302 thus applies power via the switched power line SP1 to whatever components are required to receive a subsequently broadcast update.

Sensor 306 does not close switch 310 (FIG. 3) when awakening receiver 300 from the stand-by mode. In the absence of power from switch 310, display 216 remains off and receiver 300 does not provide audio or video signals to the attached television or other display device. Thus, from the user's perspective, receiver 300 is in a standby mode. This feature of the invention is important, as users might otherwise be startled or annoyed when their receiver and/or television automatically turns on without their instruction to do so. Receiver 300 might indicate the standby mode to the user; alternatively, receiver 300 might simply appear to be powered off.

Figure 5:
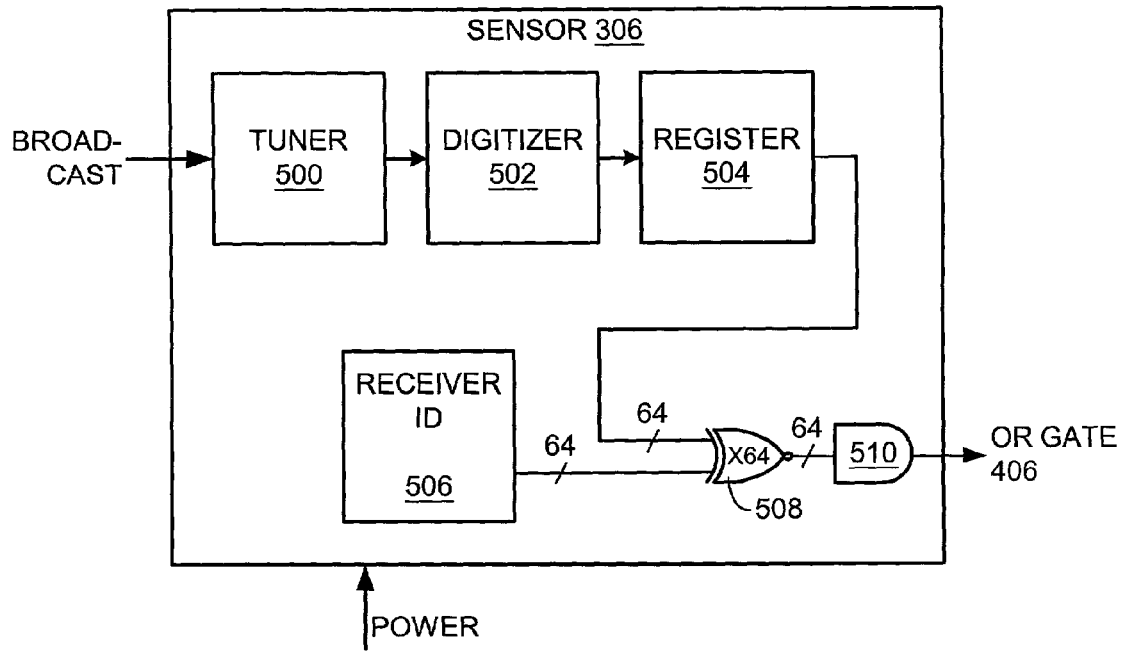
FIG. 5 depicts an embodiment of sensor 306 that enables the broadcaster to selectively awake only a select number of specified receivers.

FIG. 5 depicts an embodiment of sensor 306 that enables the broadcaster to awaken only a select number of specified receivers using, in one embodiment, a very low bit-rate asynchronous serial transmission. This version of sensor 306 includes a simple AM tuner 500, a digitizer 502, a shift register 504, a receiver identifier 506 unique to each receiver and/or unique to the level of programming to which the receiver is entitled, a collection of exclusive-OR (XOR) gates 508 serving as a comparator, and an AND gate 510. Digitizer 502 can be the same or a different component from digitizer 402 of FIG. 4. If a single digitizer is used, then additional circuitry selects between tuner 400 and tuner 500, depending upon whether receiver 300 is in a standby mode, and the digitizer is supplied power in the standby mode.

In the embodiment of FIG. 5, the amplitude of the wake-up signal remains high for the duration of the update. In other embodiments, control of switch 304 passes to processor 202 once power is supplied from switch 304. Processor 202 then decides when to return receiver 300 to the standby mode. In another embodiment, processor 202 is always powered up, providing an intelligent means of responding to wake-up instructions.

As before, tuner 500 is tuned to a carrier frequency that the broadcaster uses to convey wake-up signals. The wake-up signal includes an identifier intended to match all or part of the number stored in receiver identifier 506. The contents of shift register 504 are continuously compared with the number stored in receiver identifier 506. If all bits match, the 64 XNOR gates 508 provide 64 logic ones to the 64 input terminals of an AND gate 510. AND gate 510 combines these output signals to produce a logic one output, thereby closing switch 304. If two corresponding bits on the inputs of XNOR gates 508 do not match, however, then XNOR gates 508 produce at least one logic zero output. Any logic zero to AND gate 510 causes AND gate 510 to output a logic zero, leaving switch 304 open and receiver 300 in the standby mode.

The example of FIG. 5 assumes receiver 300 is in the standby mode to start with. If the receiver is powered upon receipt of the wake-up signal, power is already applied to the circuits required to receive the update. An additional connection (not shown) between the output of AND gate 510 and processor 202 can be used to enable or block the incoming update, depending upon whether the receiver ID matched the incoming identifier.

Display 216 (FIG. 2) is always responsive to user input, turning on and off in response to commands from IR interface 214. To avoid confusing the user, wake-up sensor 306 cannot turn display on or off automatically. Display 216 does not indicate a power-on condition when awakened by a wake-up instruction so users are not confused to see receiver 300 automatically power up; similarly, if the user elects to turn off receiver-unit 300 during an upgrade, receiver 300 remains active but switch 304 opens, turning off encoder 208, DAC 206, and display 216. Receiver 300 enters the standby mode upon completion of the update. In other embodiments, display 216 or some other visual indicators, such as an LED, remain powered and indicate that receiver 300 is in a standby mode.

While the present invention has been described in connection with specific embodiments, variations of these embodiments will be obvious to those of ordinary skill in the art. For example, other components, such as modem 210, can be configured to initiate the "on" signal to awaken receiver 300. Therefore, the spirit and scope of the appended claims should not be limited to the foregoing description.

What is claimed is:

1. A broadcast receiver comprising:
   a. a power supply having a power-supply output terminal; and
   b. a broadcast interface circuit including:
      i. an interface-circuit input terminal adapted to receive a plurality of broadcast communications signals, each signal modulated about a selected carrier frequency;
      ii. a tuner having a tuner input terminal coupled to the interface circuit input terminal, wherein the tuner selects one of the signals and provides the selected signal on a tuner output terminal;
      iii. a wake-up sensor having a sensor input terminal coupled to the interface circuit input terminal and a wake-up-sensor output terminal, wherein the wake-up sensor produces a wake-up signal on the wake-up sensor output terminal directly in response to receiving a first selected signal; and
      iv. a wake-up switch having a wake-up-switch input terminal coupled to the power-supply output terminal, a wake-up-switch output terminal, and a wake-up-switch control terminal coupled to the wake-up-sensor output terminal to receive the wake-up signal, wherein the wake-up switch is closed in direct response to receiving the wake-up signal thereby providing power from the power-supply output terminal to the wake-up switch output terminal.

2. The receiver of claim 1, the wake-up sensor further including a second tuner tuned to a carrier frequency associated with the first selected signal.

3. The receiver of claim 2, the wake-up-sensor further comprising a digitizer coupled between the tuner and the wake-up-switch control terminal.

4. The receiver of claim 1, wherein the tuner includes a power terminal coupled to the wake-up-switch output terminal.

5. The receiver of claim 1, further comprising a display capable of indicating a power-on condition for the receiver, the display having a power-input terminal coupled to the power supply via a second switch.

6. The receiver of claim 5, wherein the display does not indicate a power-on condition in response to the wake-up signal.

7. The receiver of claim 1, further comprising a processor having a processor power terminal coupled to the wake-up-switch output terminal.

8. A broadcast communication network comprising:
   a. a broadcast head-end adapted to broadcast a plurality of signals about a corresponding plurality of carrier frequencies, the signals including an occasional wake-up instruction;
   b. a plurality of receivers adapted to receive the plurality of signals, each receiver including:
      i. a power supply having a power-supply output terminal; and
      ii. a broadcast interface circuit including:
         (1) an interface-circuit input terminal adapted to receive a plurality of broadcast communications signals, each signal modulated about a selected carrier frequency;
         (2) a wake-up sensor having a sensor input terminal coupled to the interface circuit input terminal and a wake-up-sensor output terminal, wherein the wake-up sensor produces a wake-up signal on the wake-up-sensor output terminal directly in response to receiving a first selected signal; and
         (3) a wake-up switch having a wake-up-switch input terminal coupled to the power-supply output terminal, a wake-up-switch output terminal, and a wake-up-switch control terminal coupled to the wake-up-sensor output terminal to receive the wake-up signal, wherein the wake-up switch is closed in direct response to receiving the wake-up signal thereby providing power from the power-supply output terminal to the wake-up switch output terminal.

9. The network of claim 8, the wake-up sensor further including a tuner tuned to a carrier frequency associated with the first selected signal.

10. The network of claim 9, the wake-up sensor further comprising a digitizer coupled between the tuner and the wake-up-switch control terminal.

11. The network of claim 9, the interface circuit including a second tuner having a turner input terminal coupled to the interface input terminal, wherein the second tuner is adapted to select one of the signals and provide the selected signal on a tuner output terminal.

12. The network of claim 11, further comprising a processor, the interface circuit further comprising a digitizer coupled between the tuner and the processor.

13. The network of claim 11, wherein the second tuner includes a power terminal coupled to the wake-up-switch output terminal.

14. The network of claim 8, further comprising, for each receiver, a display capable of indicating a power-on condition for the receiver, the display having a power-input terminal coupled to the power supply via a second switch.

15. The network of claim 14, wherein the display does not indicate a power-on condition in response to the wake-up instruction.

16. A method of reducing power usage in a broadcast receiver, the method comprising:
   a. monitoring, in a standby mode, a user-input device for a power-on instruction;
   b. indicating a power-on condition for the receiver in response to the power-on instruction;
   c. monitoring the user-input device for a power-off instruction;
   d. indicating a standby condition for the receiver in response to the power-off instruction;
   e. monitoring, with the receiver in the standby condition, a broadcast communication channel for a wake-up instruction; and
   f. providing power to a first portion including a control processor of the receiver and indicating a standby condition for the receiver while receiving a receiver update, in direct response to receiving the wake-up instruction.

17. The method of claim 16, further comprising, upon receipt of a power-on instruction in the standby condition, providing power to the first portion and a second portion of the receiver and indicating the power-on condition.

18. The method of claim 16, wherein indicating a power-on condition includes providing a video signal to a video display device.

19. The method of claim 16, wherein the user-input device comprises an infrared receiver.

20. A broadcast receiver comprising:
   a. means for monitoring a user-input device for a power-on instruction;
   b. display means for indicating a power-on condition for the receiver in response to the power-on instruction;
   c. means for monitoring the user-input device for a power-off instruction;
   d. means responsive to the power-off instruction for indicating a power-off condition for the receiver; and
   e. means for monitoring a broadcast communication channel for a wake-up instruction with the receiver in the power-off condition, wherein the means for monitoring the broadcast communication channel includes a power switch for providing power to a control processor in direct response to the wake-up instruction.

21. The receiver of claim 20, wherein the display means indicates the power-off condition when the power switch provides power to the processor in response to the wake-up instruction.

* * * * *